(12) United States Patent
Al-Asaaed et al.

(10) Patent No.: US 8,819,154 B2
(45) Date of Patent: Aug. 26, 2014

(54) USER INTERFACE METHODS AND APPARATUS FOR USE IN COMMUNICATING TEXT AND PHOTO MESSAGES

(75) Inventors: Ennis Al-Asaaed, Kanata (CA); Abdallah Ibdah, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 395 days.

(21) Appl. No.: 13/273,465

(22) Filed: Oct. 14, 2011

(65) Prior Publication Data

US 2013/0093833 A1   Apr. 18, 2013

(51) Int. Cl.
*G06F 15/16*   (2006.01)

(52) U.S. Cl.
USPC ............... 709/206; 348/14.01; 348/14.12; 379/88.13; 379/88.17; 455/414.1; 455/556.1; 455/557

(58) Field of Classification Search
CPC . H04N 1/00; H04N 1/00127; H04N 1/00137; H04N 1/0014; H04N 1/00206; H04N 1/00209; H04N 1/00312; H04N 1/00318; H04N 1/327041; H04M 1/72527; H04M 2201/42; H04M 2201/50; H04M 2201/52; H04M 2201/60; G06Q 10/107
USPC ............... 348/14.01–14.16; 370/259–271, 370/351–357; 709/201–207, 217–248
See application file for complete search history.

(56) References Cited

U.S. PATENT DOCUMENTS

| 7,158,172 | B2 | 1/2007 | Kawaoka et al. | |
| 7,173,651 | B1 * | 2/2007 | Knowles | 348/207.1 |
| 7,437,419 | B2 | 10/2008 | Tu et al. | |
| 2001/0012072 | A1 | 8/2001 | Ueno | |
| 2003/0133015 | A1 | 7/2003 | Jackel et al. | |
| 2005/0134719 | A1 | 6/2005 | Beck | |
| 2006/0041627 | A1 * | 2/2006 | Tu | 709/206 |
| 2006/0041632 | A1 * | 2/2006 | Shah et al. | 709/217 |
| 2006/0072820 | A1 | 4/2006 | Porjo et al. | |
| 2006/0121850 | A1 * | 6/2006 | Hama | 455/41.2 |
| 2006/0193448 | A1 * | 8/2006 | Donoghue et al. | 379/67.1 |
| 2006/0232808 | A1 * | 10/2006 | Lyons et al. | 358/1.13 |
| 2008/0240094 | A1 * | 10/2008 | Chang | 370/389 |
| 2009/0286515 | A1 * | 11/2009 | Othmer | 455/413 |

(Continued)

FOREIGN PATENT DOCUMENTS

| WO | 2003077550 A1 | 9/2003 |
| WO | 2006060794 A1 | 6/2006 |
| WO | 2011085248 A1 | 7/2011 |

OTHER PUBLICATIONS

"MXit", Wikipedia, Oct. 11, 2011, XP002671416, URL: http://en.wikipedia.org/w/index.php?title=MXit&oldid=455012458.

(Continued)

*Primary Examiner* — Hemant Patel
(74) *Attorney, Agent, or Firm* — Rowand LLP

(57) ABSTRACT

Techniques for use in messaging from a portable communication device having a camera module are described. In an instant communication session, the portable device displays a message thread involving two or more participants and a text input field for entering text. In response to an input to capture an image, the portable device automatically captures a photographic image via the camera module, attaches the photographic image to a message, and sends the message to at least one of the two or more participants.

18 Claims, 16 Drawing Sheets

(56) References Cited

U.S. PATENT DOCUMENTS

| | | |
|---|---|---|
| 2009/0318194 A1 | 12/2009 | Alberth, Jr. et al. |
| 2010/0005402 A1* | 1/2010 | George et al. ................ 715/758 |
| 2010/0013977 A1 | 1/2010 | Suzuki |
| 2010/0235746 A1 | 9/2010 | Anzures et al. |
| 2011/0296320 A1* | 12/2011 | Kwon et al. .................. 715/758 |

OTHER PUBLICATIONS

European Search Report for EP patent application #11185319.8, Mar. 14, 2012.

* cited by examiner

USER INTERFACE METHODS AND APPARATUS FOR USE IN COMMUNICATING TEXT AND PHOTO MESSAGES

BACKGROUND

1. Field of the Technology

The present disclosure relates generally to messaging with use of portable communication devices, and more particularly to user interface techniques for use in communicating text and photo messages from mobile communication devices which communicate in wireless communication networks.

2. Description of the Related Art

Portable communication devices, such as wireless communication devices operating in wireless communication networks, include capabilities which include voice telephony and messaging. The messaging may include text messaging, such as short message service (SMS) messaging or multimedia messaging service (MMS) messaging, electronic-mail (e-mail) messaging, instant messaging, messaging in chat sessions, as a few examples.

These devices may also include camera modules for capturing photographic images. In some approaches, messaging functions and photo functions are provided as separate applications or processes, where the features of one function are accessible from the other function. Here, the processing steps involved typically disrupt the natural flow for messaging for the end user, options are limited, and the communication experience may be cumbersome and inefficient. For example, the end user may initiate a camera application, take a picture, and save the picture in device memory. Subsequently, the end user may access a menu for selecting a messaging function, attach the picture to a message, and send the message using the messaging function. On the other hand, for example, the end user may initiate a messaging application and compose a message. If the end user desires to send a picture in the message, the end user may then access a menu for invoking the camera application and then take a picture. Subsequently, the end user will attach the picture to the message and send it.

What are needed are methods and apparatus to overcome these and related or similar deficiencies of the prior art. The same or similar problems may exist with other types of features and functionality.

BRIEF DESCRIPTION OF THE DRAWINGS

Embodiments of present disclosure will now be described by way of example with reference to attached figures, wherein.

DETAILED DESCRIPTION OF THE EMBODIMENTS

User interface methods and apparatus for use in communicating text and photo messages from a portable communication device are described herein. In an instant communication mode, the portable communication device presents a conversation thread of a message conversation involving one or more participants. A text input field for entering text for the message conversation is also presented. In response to detecting an actuation of a send or enter key, the device sends to the one or more participants a message which includes the text from the text input field. On the other hand, in response to detecting an actuation of a camera shutter key, the device performs an automatic multi-step process which includes capturing a photographic image with a camera module, attaching the photographic image to a message, and sending to the one or more participants the message which includes the attached photographic image. A camera preview mode and user input prompts (e.g. for saving, confirming, etc.) may be suppressed during this process. On the other hand, in a non-instant communication mode, in response to detecting an actuation of the camera shutter key, the device performs a multi-step process which includes capturing a photographic image with the camera module and attaching the photographic image to a message, without sending the message. Even further, in a voice call mode where a voice call is maintained with a voice call participant via the wireless network, in response to detecting an actuation of the camera shutter key, the device performs an automatic multi-step process which includes capturing a photographic image with the camera module, attaching the photographic image to a message, and sending to the voice call participant the message which includes the attached photographic image.

Figure 1:
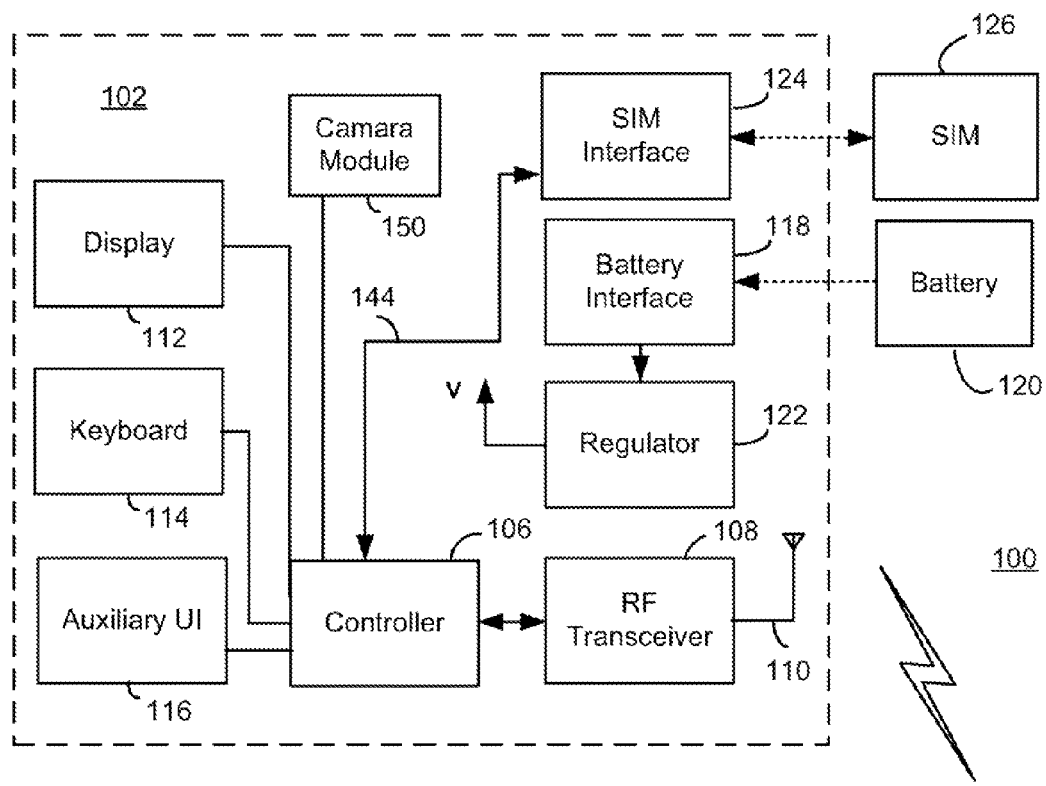
FIG. 1 is a schematic block diagram of a communication system which includes a portable communication device, which may be a wireless communication device which operates for communication in a wireless communication network.
Figure 1:
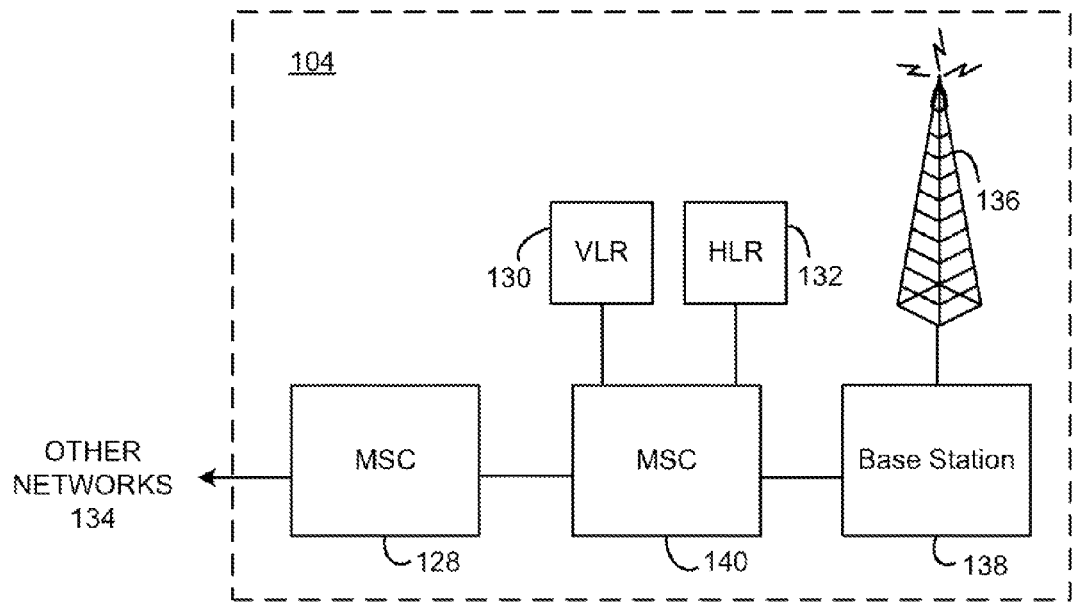

To illustrate one exemplary environment within which the present techniques may be practiced, FIG. 1 is a block diagram of a communication system 100 which includes a portable communication device, which is wireless communication device 102 which communicates through a wireless communication network 104. Wireless communication device 102 may include a display 112, a keyboard 114, and one or more auxiliary user interfaces (UI) 116, and a camera module 150, each of which is coupled to a controller 106. Controller 106 is also coupled to radio frequency (RF) transceiver circuitry 108 and an antenna 110.

In most modern communication devices, controller 106 is embodied as a central processing unit (CPU) which runs operating system software in a memory component (not shown). Controller 106 normally controls overall operation of wireless device 102, whereas signal processing operations associated with communication functions are typically performed in RF transceiver circuitry 108. Controller 106 interfaces with device display 112 to display received information, stored information, input requests, and the like. Keyboard 114, which may be a telephone type keypad or full alphanumeric keyboard, is normally provided for entering data for storage in wireless device 102, information for transmission to network 104, a telephone number to place a telephone call, commands to be executed on wireless device 102, and possibly other or different input requests. In one embodiment, keyboard 114 may be or include a physical keyboard or a virtual or "soft" keyboard, implemented, for example, by way of images of keys rendered on a touch screen display.

Wireless device 102 sends communication signals to and receives communication signals from network 104 over a wireless link via antenna 110. RF transceiver circuitry 108 performs functions similar to those of base station 138, including for example modulation/demodulation and possibly encoding/decoding and encryption/decryption. It is also contemplated that RF transceiver circuitry 108 may perform certain functions in addition to those performed by base station 138. It will be apparent to those skilled in art that RF transceiver circuitry 108 will be adapted to particular wireless network or networks in which wireless device 102 is intended to operate.

Wireless device 102 includes a battery interface 118 for receiving one or more rechargeable batteries 120. Battery 120 provides electrical power to (most if not all) electrical circuitry in wireless device 102, and battery interface 118 provides for a mechanical and electrical connection for battery 120. Battery interface 118 is coupled to a regulator 122 which regulates power for the device. When wireless device 102 is fully operational, an RF transmitter of RF transceiver circuitry 108 is typically keyed or turned on only when it is sending to network 104, and is otherwise turned off to conserve resources. Such intermittent operation of transmitter has a dramatic effect on power consumption of wireless device 102. Similarly, an RF receiver of RF transceiver circuitry 108 is typically periodically turned off to conserve power until it is needed to receive signals or information (if at all) during designated time periods.

Wireless device 102 may consist of a single unit, such as a data communication device, a cellular telephone, a multiple-function communication device with data and voice communication capabilities such as a mobile telephone with data communication functionality, a personal digital assistant (PDA) enabled for wireless communication, a tablet computing device, or a computer incorporating an internal modem. Alternatively, wireless device 102 may be a multiple-module unit comprising a plurality of separate components, including but in no way limited to a computer or other device connected to a wireless modem. In particular, for example, in the wireless device block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a wireless device 102 may have a more particular implementation as described later in relation to wireless device 202 of FIG. 2.

Wireless device 102 may operate using a Subscriber Identity Module (SIM) 126 which is connected to or inserted in wireless device 102 at a SIM interface 124. SIM 126 is one type of a conventional "smart card" used to identify an end user (or subscriber) of wireless device 102 and to personalize the device, among other things. Without SIM 126, the wireless device terminal is not fully operational for communication through wireless network 104. By inserting SIM 126 into wireless device 102, an end user can have access to any and all of his/her subscribed services. In order to identify the subscriber, SIM 126 contains some user parameters such as an International Mobile Subscriber Identity (IMSI) and a Mobile Station Integrated International Service Digital Network (MSISDN). In addition, SIM 126 is typically protected by a four-digit Personal Identification Number (PIN) which is stored therein and known only by the end user. An advantage of using SIM 126 is that end users are not necessarily bound by any single physical wireless device. Typically, the only element that personalizes a wireless device terminal is a SIM card. Therefore, the user can access subscribed services using any wireless device equipped to operate with the user's SIM.

Some information stored on SIM 126 (e.g., address book and SMS messages) may be retrieved and visually displayed on display 112. Wireless device 102 has one or more software applications which are executed by controller 106 to facilitate the information stored on SIM 126 to be displayed on display 112. Controller 106 and SIM interface 124 have data and control lines 144 coupled therebetween to facilitate the transfer of the information between controller 106 and SIM interface 124 so that the information may be visually displayed. An end user enters input requests at keyboard 114, for example, and in response, controller 106 controls SIM interface 124 and SIM 126 to retrieve the information for display. The end user may also enter input requests at keyboard 114, for example, and, in response, controller 106 controls SIM interface 124 and SIM 126 to store information on SIM 126 for later retrieval and viewing. The software applications executed by controller 106 may include an application to retrieve and display address book information stored on SIM 126, and an application to retrieve and display SMS message information stored on SIM 126.

Wireless device 102 communicates in and through wireless communication network 104. In the embodiment of FIG. 1, wireless network 104 is a Global Systems for Mobile (GSM) and General Packet Radio Service (GPRS) network. Wireless network 104 includes a base station 138 with an associated antenna tower 136, a Mobile Switching Center (MSC) 140, a Visitor Location Register (VLR) 130, a Home Location Register (HLR) 132, and a Short Message Service Center (SMS-SC) 128. MSC 140 is coupled to base station 138 and to SMS-SC 128, which is in turn coupled to other network(s) 134.

Base station 138, including its associated controller and antenna tower 136, provides wireless network coverage for a particular coverage area commonly referred to as a "cell". Base station 138 transmits communication signals to and receives communication signals from wireless devices within its cell via antenna tower 136. Base station 138 normally performs such functions as modulation and possibly encoding and/or encryption of signals to be transmitted to the wireless device in accordance with particular, usually predetermined, communication protocols and parameters, under control of its controller. Base station 138 similarly demodulates and possibly decodes and decrypts, if necessary, any communication signals received from wireless device 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and wireless device 102. Those skilled in art will appreciate that a wireless network in actual practice may include hundreds of cells, each served by a distinct base station 138 and transceiver, depending upon desired overall expanse of network coverage. All base station controllers and base stations may be connected by multiple switches and routers (not shown), controlled by multiple network controllers.

For all wireless devices 102 registered with a network operator, permanent data (such as wireless device 102 user's profile) as well as temporary data (such as wireless device's 102 current location) are stored in HLR 132. In case of a voice call to wireless device 102, HLR 132 is queried to determine the current location of wireless device 102. VLR 130 is responsible for a group of location areas and stores the data of those wireless devices that are currently in its area of responsibility. This includes parts of the permanent wireless device data that have been transmitted from HLR 132 to VLR 130 for faster access. However, VLR 130 may also assign and store local data, such as temporary identifications. Optionally, VLR 130 can be enhanced for more efficient co-ordination of GPRS and non-GPRS services and functionality (e.g., paging for circuit-switched calls, and combined GPRS and non-GPRS location updates).

Being part of the GPRS network, a Serving GPRS Support Node (SGSN) is at the same hierarchical level as MSC 140 and keeps track of the individual locations of wireless devices. An SGSN also performs security functions and access control. Further, a Gateway GPRS Support Node (GGSN) provides interworking with external packet-switched networks and is connected with SGSNs via an IP-based GPRS backbone network. The SGSN performs authentication and cipher setting procedures based on the same algorithms, keys, and criteria as in existing GSM. For SMS transfer over GPRS, the SGSN is used in place of MSC 140.

In order to access GPRS services, wireless device 102 first makes its presence known to wireless network 104 by performing what is known as a GPRS "attach". This operation establishes a logical link between wireless device 102 and the SGSN and makes wireless device 102 available to receive, for example, pages via SGSN, notifications of incoming GPRS data, or SMS messages over GPRS. In order to send and receive GPRS data, wireless device 102 assists in activating the packet data address that it wants to use. This operation makes wireless device 102 known to the GGSN; interworking with external data networks can thereafter commence. User data may be transferred transparently between wireless device 102 and the external data networks using, for example, encapsulation and tunneling. Data packets are equipped with GPRS-specific protocol information and transferred between wireless device 102 and the GGSN.

SMS makes use of SMS-SC 128 which acts as a store-and-forward system for relaying short messages. Messages are stored in the network until the destination device becomes available, so a user can receive or transmit an SMS message at any time, whether a voice call is in progress or not. SMS-SC 128 may be integrated with a Gateway MSC for Short Message Service (SMS-GMSC) and an Interworking MSC for Short Message Service (SMS-IWMSC), as would be the case shown in FIG. 1. An SMS-GMSC is a function for receiving a short message from an SMS-SC, interrogating an HLR for routing information and SMS info, and delivering the short message for the recipient MS. An SMS-IWMSC is a function for receiving a short message from within the network and submitting it to the recipient SMS-SC. Other messages which may be delivered are Multimedia Messaging Service (MMS) messages. The above configuration may be provided in substantial accordance with $3^{rd}$ Generation Partnership Project, Technical Specification 03.40, V6.2.0, 2001 December (Release 1997) (3GPP TS 03.40).

As apparent from the above, the wireless network includes fixed network components including RF transceivers, amplifiers, base station controllers, network servers, and servers connected to network. Those skilled in art will appreciate that a wireless network may be connected to other systems, possibly including other networks, not explicitly shown in FIG. 1.

Figure 2:
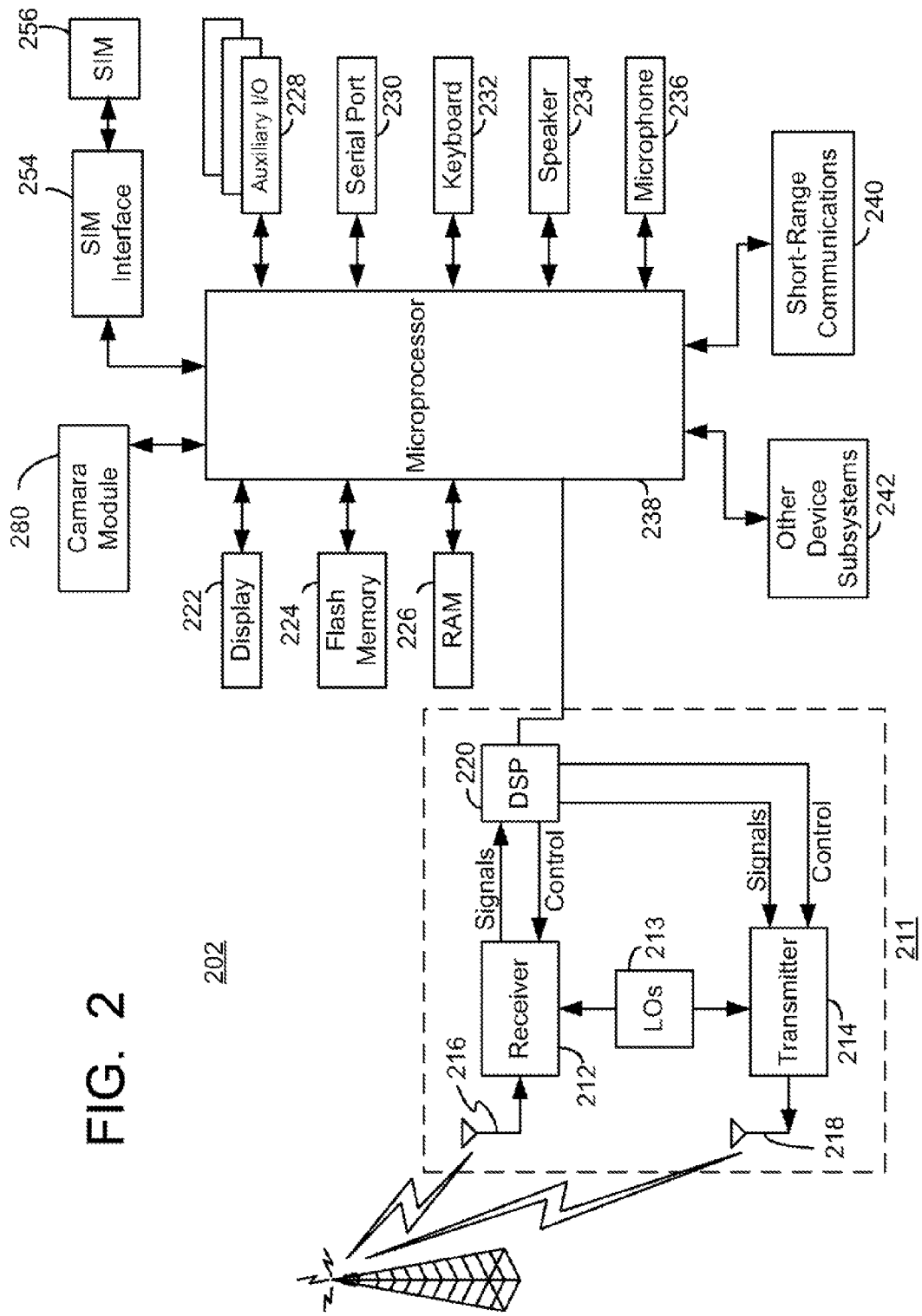
FIG. 2 is a more detailed example of the wireless communication device of FIG. 1.

FIG. 2 is a more detailed block diagram of an exemplary wireless communication device 202. Wireless device 202 may be a two-way communication device having at least voice and data communication capabilities, including the capability to communicate with other computer systems. Depending on the functionality provided, wireless device 202 may be referred to as a mobile station, a user equipment, a data messaging device, a two-way pager, a cellular telephone with data messaging capabilities, a wireless Internet appliance, or a data communication device (with or without telephony capabilities).

If wireless device 202 is enabled for two-way communication, wireless device 202 will normally incorporate a communication subsystem 211, which includes a receiver 212, a transmitter 214, and associated components, such as one or more (e.g., embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which wireless device 202 is intended to operate.

Network access requirements will also vary depending upon type of network utilized. In GPRS networks, for example, network access is associated with a subscriber or user of wireless device 202. A GPRS device therefore operates in conjunction with a Subscriber Identity Module, commonly referred to as a "SIM" card 256, in order to operate on the GPRS network. Without such a SIM card 256, a GPRS device will not be fully functional. Local or non-network communication functions (if any) may be operable, but wireless device 202 will be unable to carry out any functions involving communications over the network. SIM 256 includes those features described in relation to FIG. 1.

Wireless device 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in the example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Wireless device 202 includes a microprocessor 238 (which is one implementation of controller 106 of FIG. 1) which controls overall operation of wireless device 202. Communication functions, including at least data and voice communications, are performed through communication subsystem 211. Microprocessor 238 also interacts with additional device subsystems such as a camera module 280, a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Data and control lines 260 extend between SIM interface 254 and microprocessor 238 for communicating data therebetween and for control. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Camera module 280 is for use in capturing photographic images through a camera lens of the device.

Operating system software used by microprocessor 238 may be stored in a persistent store such as flash memory 224, which may alternatively be a read-only memory (ROM), a battery backed-up RAM, or similar storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on wireless device 202. A predetermined set of applications which control basic device operations, including at least data and voice communication applications (such as a user interface technique), will normally be installed on wireless device 202 during its manufacture. One exemplary application that may be loaded onto wireless device 202 may be a personal information manager (PIM) application having the ability to organize and manage data items relating to a user such as, but not limited to, e-mail, calendar events, voice mails, appointments, and task items. Naturally, one or more memory stores are available on wireless device 202 and SIM 256 to facilitate storage of PIM data items and other information.

The PIM application has the ability to send and receive data items via the wireless network. In an exemplary embodiment, PIM data items are seamlessly integrated, synchronized, and updated via the wireless network, with the wireless device user's corresponding data items stored and/or associated with a host computer system thereby creating a mirrored host computer on wireless device 202 with respect to such items. This is especially advantageous where the host computer system is the wireless device user's office computer system. Additional applications may also be loaded onto wireless device 202 through network, an auxiliary I/O subsystem 228, serial port 230, short-range communications subsystem 240, or any other suitable subsystem 242, and installed by a user in RAM 226 or a non-volatile store for execution by microprocessor 238. Such flexibility in application installation increases the functionality of wireless device 202 and may provide enhanced on-device functions, communication-related functions, or both. For example, secure communication applications may enable electronic commerce functions and other such financial transactions to be performed using wireless device 202.

In a data communication mode, data such as an SMS message will be processed by communication subsystem 211 and input to microprocessor 238. Microprocessor 238 may further process the signal for output to display 222 or alternatively to auxiliary I/O device 228. A user of wireless device 202 may also compose data items, such as SMS messages, using keyboard 232 in conjunction with display 222 and possibly auxiliary I/O device 228. Keyboard 232 may be a complete alphanumeric keyboard and/or telephone-type keypad. In one embodiment, keyboard 232 may be or include a physical keyboard or a virtual or "soft" keyboard, implemented, for example, by way of images of keys rendered on a touch screen display. The composed items may be transmitted over a communication network through communication subsystem 211.

For voice communications, the overall operation of wireless device 202 is substantially similar, except that the received signals are output to speaker 234 and signals for transmission are generated by microphone 236. Alternative voice or audio I/O subsystems, such as a voice message recording subsystem, may also be implemented on wireless device 202. Although voice or audio signal output may be accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of wireless device 202 by providing for information or software downloads to wireless device 202 other than through a wireless communication network. The alternate download path may, for example, be used to load an encryption key onto wireless device 202 through a direct and thus reliable and trusted connection to thereby provide secure device communication.

Short-range communications subsystem 240 of FIG. 2 is an additional optional component which provides for communication between wireless device 202 and different systems or devices, which need not necessarily be similar devices. For example, subsystem 240 may include an infrared device and associated circuits and components, a Bluetooth™ communication module, or an 802.11 communication module, to provide for communication with similarly-enabled systems and devices. Bluetooth™ is a registered trademark of Bluetooth SIG, Inc. Those skilled in the art will appreciate that "Bluetooth" and "802.11" refer to sets of specifications, available from the Institute of Electrical and Electronics Engineers (IEEE), relating to wireless personal area networks and wireless local area networks, respectively.

Wireless device 202 also includes a battery interface (such as that described in relation to FIG. 1) for receiving one or more rechargeable batteries. Such a battery provides electrical power to most if not all electrical circuitry in wireless device 202, and the battery interface provides for a mechanical and electrical connection for it. The battery interface is coupled to a regulator which regulates a voltage to all of the circuitry.

Figure 3:
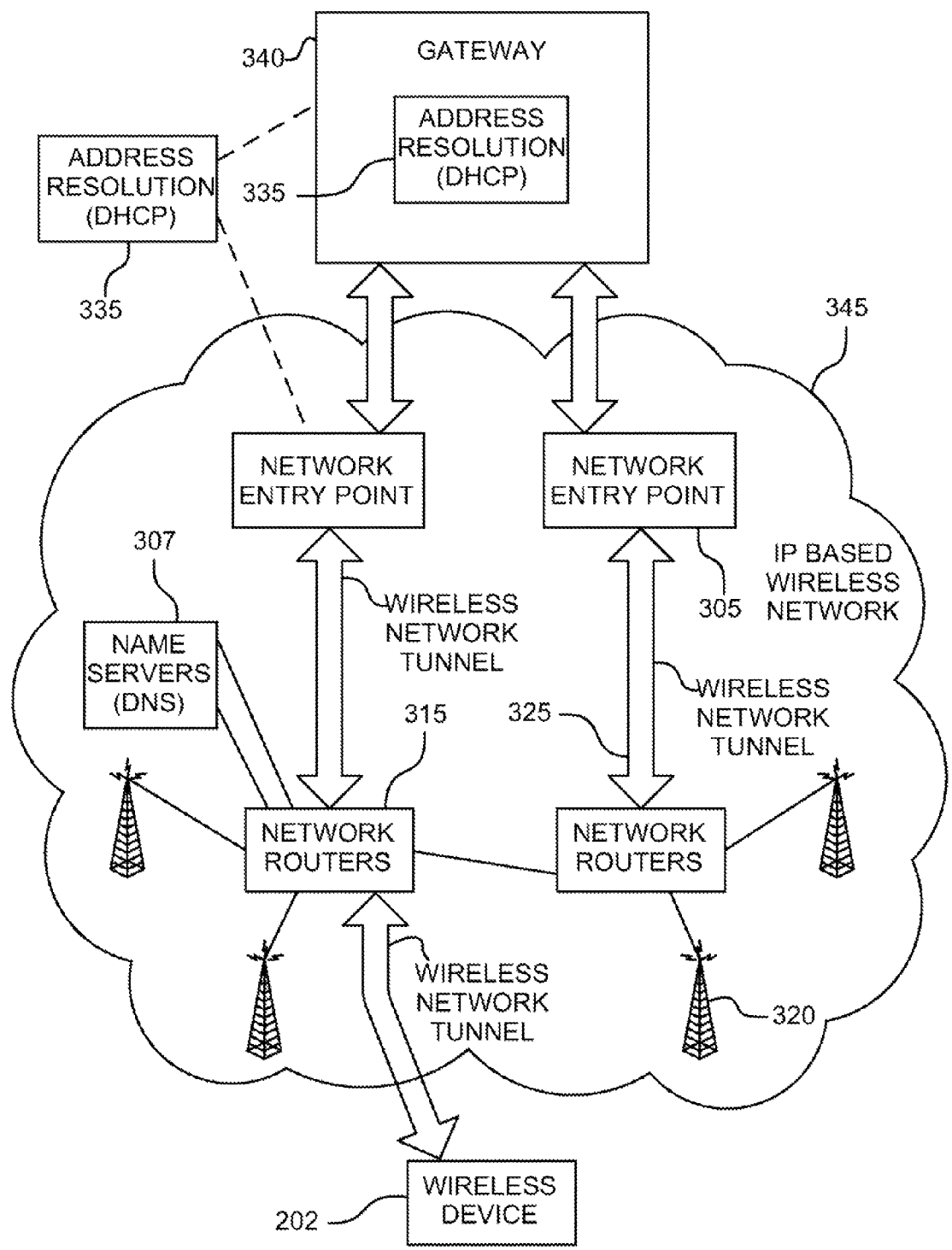
FIG. 3 is a particular structure of a system for data packet communications for the wireless communication device of FIGS. 1-2.

FIG. 3 shows a particular system architecture for communicating with a wireless communication device. In particular, FIG. 3 shows basic components of an IP-based wireless data network, such as a GPRS network. Wireless device 202 communicates with a wireless packet data network 345, and may also be capable of communicating with a wireless voice network (not shown). The voice network may be associated with the IP-based wireless network as similar to, for example, GSM and GPRS networks, or alternatively may be a completely separate network. The GPRS IP-based data network is unique in that it is effectively an overlay on the GSM voice network. As such, GPRS components will either extend existing GSM components, such as base stations 320, or require additional components to be added, such as an advanced Gateway GPRS Service Node (GGSN) as a network entry point 305. Such network architecture may facilitate the communication of data messages, such as multimedia messaging service (MMS) messages.

As shown in FIG. 3, a gateway 340 may be coupled to an internal or external address resolution component 335 and one or more network entry points 305. Data packets are transmitted from gateway 340, which is source of information to be transmitted to wireless device 202, through wireless network 345 by setting up a wireless network tunnel 325 from gateway 340 to wireless device 202. In order to create this wireless tunnel 325, a unique network address is associated with wireless device 202. In an IP-based wireless network, however, network addresses are typically not permanently assigned to a particular wireless device 202 but instead are dynamically allocated on an as-needed basis. Thus, wireless device 202 may acquire a network address and for gateway 340 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and wireless devices. In this example, address resolution component 335 is shown as a dynamic host configuration protocol (DHCP) server as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize a plurality (e.g., thousands) of base stations 320 normally implemented in a relatively large network into a central location for a long-haul connection back to network entry point 305. In some networks there may be multiple tiers of network routers 315 and there may be cases where there are master and slave network routers 315, but in all such cases the functions of network routers 315 are similar. Often network router 315 will access a name server 307, in this case shown as a dynamic name server (DNS) 307 as used in the Internet, to look up destinations for routing data messages. Base stations 320, as described above, provide wireless links to wireless devices such as wireless device 202.

Wireless network tunnels such as a wireless tunnel 325 are opened across wireless network 345 in order to allocate necessary memory, routing, and address resources to deliver IP packets. In GPRS, such tunnels 325 are established as part of what are referred to as "PDP contexts" (i.e., data sessions). To open wireless tunnel 325, wireless device 202 may use a specific technique associated with wireless network 345. The step of opening such a wireless tunnel 325 may require wireless device 202 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one wireless device 202 for redundancy, or to access different gateways and services on the network. Once the domain name is found, the tunnel is then extended to network entry point 305 and necessary resources are allocated at each of the nodes along the way. Network entry point 305 then uses address resolution component 335 (e.g., DHCP server 335) to allocate an IP address for wireless device 202. When an IP address has been allocated to wireless device 202 and communicated to gateway 340, information can then be forwarded from gateway 340 to wireless device 202.

Wireless tunnel 325 typically has a limited life, depending on wireless device's 202 coverage profile and activity. Wireless network 345 will tear down wireless tunnel 325 after a certain period of inactivity or out-of-coverage period, in order to recapture resources held by this wireless tunnel 325 for other users. The main reason for this is to reclaim the IP address temporarily reserved for wireless device 202 when wireless tunnel 325 was first opened. Once the IP address is lost and wireless tunnel 325 is torn down, gateway 340 loses all ability to initiate IP data packets to wireless device 202, whether over Transmission Control Protocol (TCP) or over User Datagram Protocol (UDP).

In the present disclosure, an IP-based wireless network (which is one specific type of wireless communication network) may include but is not limited to a Code Division Multiple Access (CDMA) network that has been developed and operated by Qualcomm; a General Packet Radio Service (GPRS) network for use in conjunction with Global System for Mobile Communications (GSM) network both developed by standards committee of European Conference of Postal and Telecommunications Administrations (CEPT); third-generation (3G) networks like Enhanced Data rates for GSM Evolution (EDGE) and Universal Mobile Telecommunications System (UMTS); 3GPP Long Term Evolution (EDGE) networks; fourth-generation (4G) networks; and so on. It is to be understood that although particular IP-based wireless networks have been described, techniques of the present disclosure could be utilized in any suitable type of wireless network. Note that the infrastructure shown and described in relation to FIG. 3 may be representative of each one of a number of different communication networks which are provided and available in the same geographic region. One of these communication networks will be selected by the wireless device, either in an automatic or manual fashion, for communications.

With reference back to FIG. 2, as previously described, wireless device 202 may include camera module 280 for use in capturing photographic images through a camera lens of the device. The end user of wireless device 202 may open a camera application. In response to opening of the camera application, the device will invoke a preview mode of the camera module 280. In the preview mode, display 222 of wireless device 202 depicts a preview of the intended photographic image to be captured through the camera lens of the device. In response to detecting an actuation of a camera shutter key during the preview mode, the device causes a photographic image to be captured with the camera module 280. The device then presents a user input prompt for saving (and/or deleting) the photographic image in memory. After saving the message, the end user may attach the saved photographic image to a message and send it from the device.

With conventional techniques, messaging functions and photo functions are typically provided as separate applications or processes, where the features of one function are accessible from the other function. Note however that conventional processing involved in text and photo messaging typically disrupt the natural flow for messaging for the end user, options are limited, and the communication experience may be cumbersome and inefficient.

Figure 4:
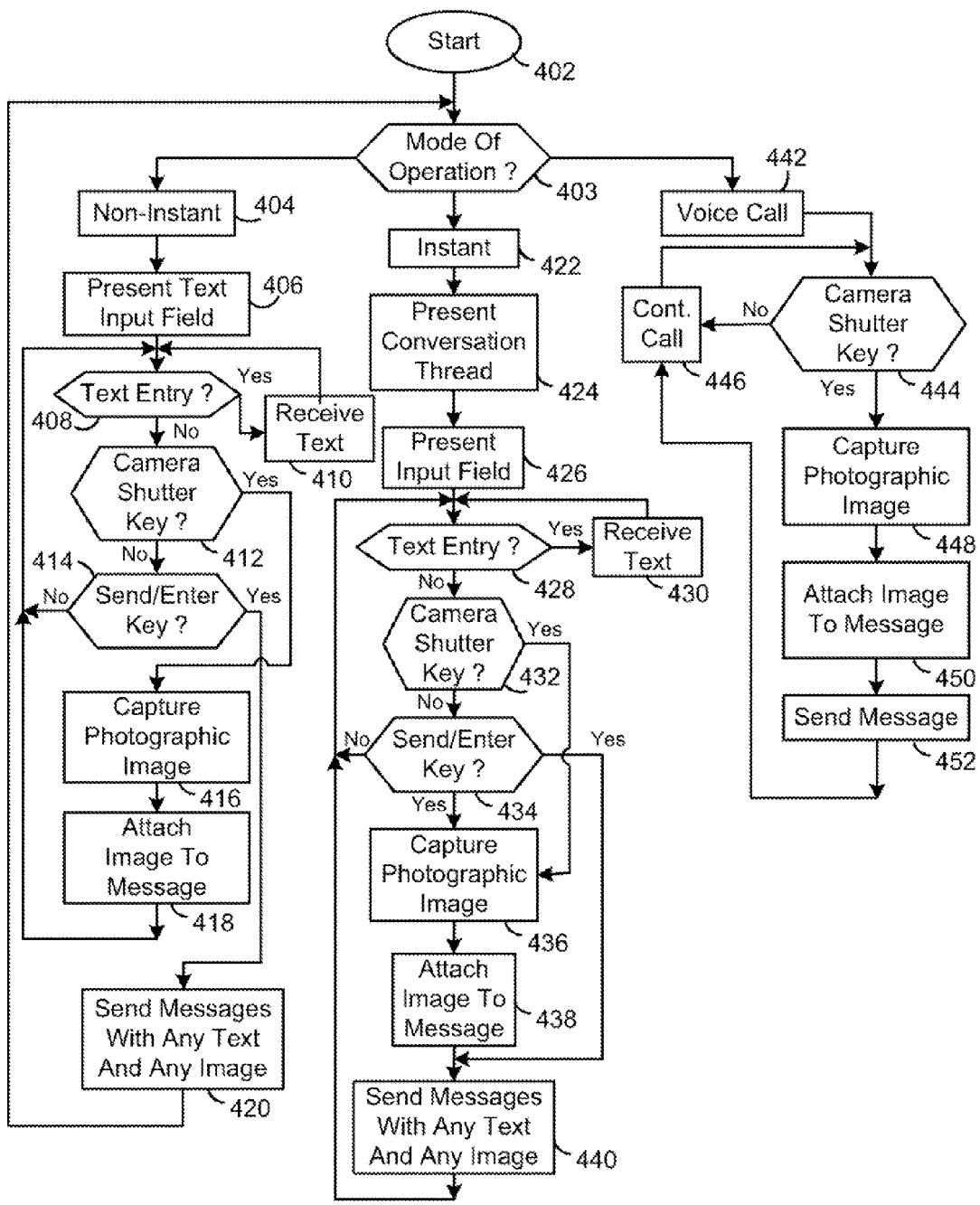
FIG. 4 is a flowchart for describing a user interface method for use in communicating text and photo messages with the wireless communication device of FIGS. 1-3.

FIG. 4 is a flowchart for describing an exemplary user interface method for use in communicating text and photo messages from a portable communication device, such as the wireless communication device described above in relation to FIGS. 1-3, which overcome deficiencies of conventional techniques. The techniques described in relation to the flowchart may be performed by one or more controllers or processors of the communication device along with its wireless transceiver. A computer program product which may embody the technique may include a computer readable medium (e.g., memory of the communication device, computer disk, CD-ROM, etc.) having computer instructions stored therein which are executable by the one or more processors of the device for performing the technique.

The flowchart of FIG. 4 is related to the presentation shown in FIGS. 5-16, which correspond to various blocks of the flowchart as will described later in more detail. In brief, FIGS. 5-9 correspond to messaging in a "non-instant" communication mode, and FIGS. 10-16 correspond to messaging in an "instant" communication mode.

Referring to the flowchart of FIG. 4, and beginning at a start block 402 of FIG. 4, the processor identifies which mode of operating/messaging is selected by the end user (block 403 of FIG. 4). The portable communication device provides a non-instant communication mode (block 404 of FIG. 4) or an instant communication mode (block 422 of FIG. 4). The portable communication device also provides a voice call mode (block 442 of FIG. 4), where a voice call is maintained with a voice call participant via the wireless network.

In FIG. 4, if the non-instant communication mode of block 404 is identified (e.g. e-mail or SMS/MMS), the processor operates to present a text input field in the display (block 406 of FIG. 4). The text input field is presented for use in entering text in the message to be sent. The processor monitors to detect, via the user interface, text entry (e.g. alphanumeric characters) from the end user (block 408 of FIG. 4). If text is entered at block 408, the processor receives and populates the text in the text entry field for the message to be sent (block 410 of FIG. 4).

The processor also monitors to detect, via the user interface, an input request corresponding to an actuation of a camera shutter key (block 412 of FIG. 4). If the processor detects the input request corresponding to the actuation of the camera shutter key at block 412, the processor causes a photographic image to be captured using the camera module (block 416 of FIG. 4) and attached to the message (block 418 of FIG. 4). Here, the photographic image (or an image or thumbnail thereof) is populated in the text entry field for presentation in the display. However, in one example, the message is not sent responsive to actuation of the camera shutter key in the non-instant communication mode. Alternatively, the message may be sent responsive to actuation of the camera shutter key in the non-instant communication mode.

In one embodiment, the process of blocks 416 and 418 suppresses the preview mode of the camera module. The process of blocks 416 and 418 may also refrain from presenting any user input prompts, e.g. a user input prompt for saving the photographic image, etc.

In the non-instant communication mode, the processor also monitors to detect, via the user interface, an input request corresponding to an actuation of a send/enter key (block 414 of FIG. 4). If the processor detects the input request corresponding to the actuation of the send/enter key at block 414, the processor causes the message to be sent via the RF transceiver through the wireless network to the intended recipients (s) (block 420 of FIG. 4). The message will include any text entered into the input field from block 410 and any photographic image captured and attached in blocks 416 and 418. The process proceeds back to block 403 as shown, or back to block 404 as an alternative.

On the other hand, if the instant communication mode of block 422 is identified (e.g. IM or BBM messaging, in connection with an existing message conversation or "chat"), the processor operates to present a conversation thread in the display (block 424 of FIG. 4). The processor also operates to present a text input field in the display (block 426 of FIG. 4). The text input field is presented for use in entering text in the message to be sent. The processor monitors to detect, via the user interface, text entry (e.g. alphanumeric characters) from the end user (block 428 of FIG. 4). If text is entered at block 408, the processor receives and presents the text in the text input field for the message to be sent (block 430 of FIG. 4).

The processor also monitors to detect, via the user interface, an input request corresponding to an actuation of the camera shutter key (block 432 of FIG. 4). If the processor detects the input request corresponding to the actuation of the camera shutter key at block 432, the processor causes an automatic multi-step process to be performed. This automatic multi-step process which is performed by the processor includes capturing a photographic image using the camera module (block 436 of FIG. 4), attaching the photographic image to the message (block 438 of FIG. 4), and causing the message to be sent via the RF transceiver through the wireless network to the intended recipient(s) (block 440 of FIG. 4). The message will also include any text entered (i.e. prior to actuation of the camera shutter key) into the text input field from block 430. The photographic image and any entered text are presented in the conversation thread. Any subsequent actuations of the camera shutter key will repeat this automatic multi-step process.

In the instant communication mode, the processor also monitors to detect, via the user interface, an input request corresponding to an actuation of the send/enter key (block 434 of FIG. 4). If the processor detects the input request corresponding to the actuation of the send/enter key at block 434, the processor causes the message to be sent via the RF transceiver through the wireless network to the intended recipients(s) (block 420 of FIG. 4). The message will include any text entered into the input field from block 430, and the text is presented in the conversation thread.

On the other hand, if the voice call mode of block 442 is identified, the processor operates to maintain a voice call via the RF transceiver with a voice call participant through the wireless network. The voice call utilizes a radio traffic channel established between the device and the wireless network. During the voice call, the processor monitors to detect, via the user interface, an input request corresponding to an actuation of the camera shutter key (block 448 of FIG. 4). If the processor detects the input request corresponding to the actuation of the camera shutter key at block 448, the processor causes an automatic multi-step process to be performed. The automatic multi-step process includes capturing a photographic image using the camera module (block 448 of FIG. 4), attaching the photographic image to the message (block 450 of FIG. 4), and causing the message to be sent via the RF transceiver through the wireless network to the voice call participant (block 452 of FIG. 4). Here, the process may operate to request and establish an additional radio traffic channel with the wireless network in order to send the message having the photographic image to the voice call participant.

In one embodiment, the message in block 452 is a Multimedia Messaging Service (MMS) message. Here, the processor operates to create an MMS message, identify the telephone number of the called or calling number of the voice call participant (i.e. taken from entry or selection of the telephone number by the end user for establishing the voice call, or through a received Caller Identification from the calling party), and populate an address recipient field ("TO" field) of the MMS message with the identified telephone number. In another embodiment, the message in block 452 is an electronic mail (e-mail) message. Here, the processor operates to create an e-mail message, select/identify the contact associated with the telephone number of the voice call participant, populate the address recipient field ("TO" field) of the e-mail message with an e-mail address extracted from the contact information of the contact corresponding to the voice call participant, and send the e-mail message. In another variation of block 452, instead of automatically causing the message with the photographic image to be sent, the processor causes a user input prompt to be presented in the display for end user confirmation to send the message. Here, the processor may present the user input prompt for the end user to enter the telephone number or e-mail address. Alternatively, the user input prompt may provide an option for the user to select between different messaging types (e.g. select between MMS and e-mail messaging, as described in the previous paragraphs) prior to sending the message.

Figure 5:
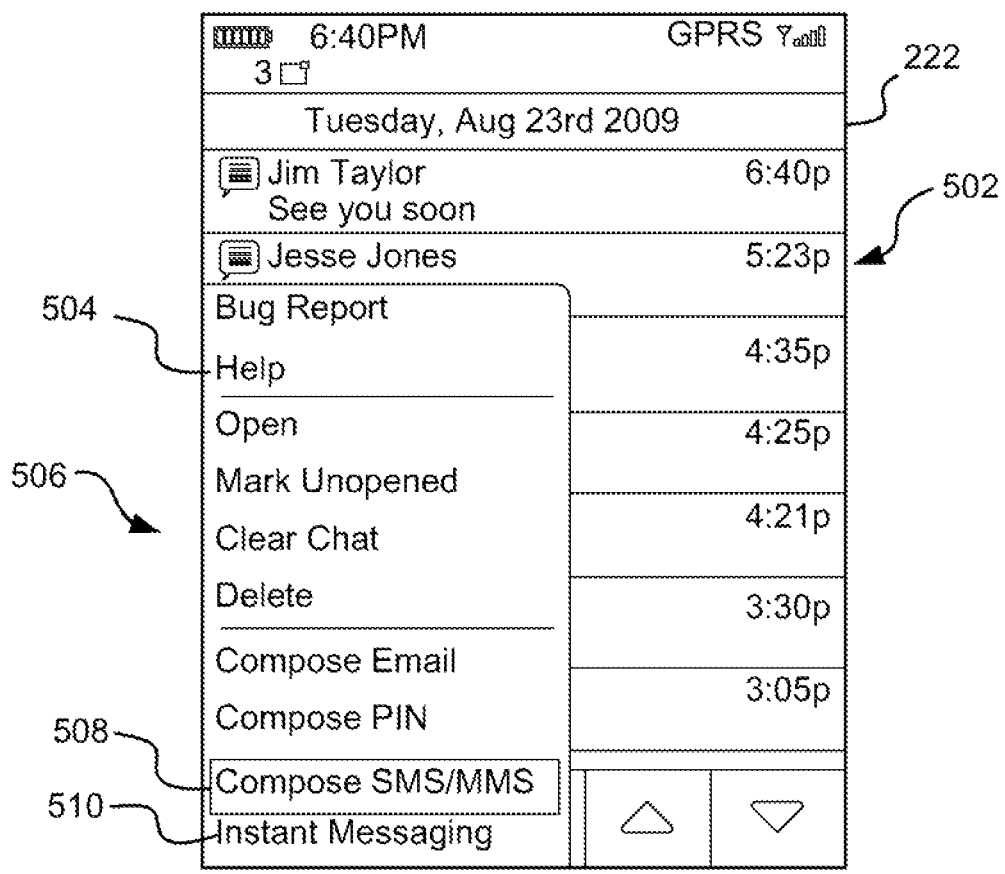
FIGS. 5-16 are display presentations in a display of the wireless communication device for depicting various actions associated with the method described in relation to the flowchart of FIG. 4, with FIGS. 5-9 corresponding to messaging in a non-instant communication mode, and FIGS. 10-16 corresponding to messaging in an instant communication mode.

FIGS. 5-9 are illustrative presentations associated with messaging in the non-instant communication mode, corresponding to blocks 404-420 of FIG. 4. Referring initially to FIG. 5, a list 502 of message headers is presented in display 222. The message headers in list 502 correspond to previously-communicated messages which are stored in memory. The messages may include messages received at the wireless device, as well as message sent from the wireless device. The message headers of the messages may be displayed in forward or reverse chronological order from the date and time they were received or sent, for example, as shown in FIG. 5.

While the list 502 of message headers is displayed, the user of the wireless device uses an input mechanism of the user interface (e.g., a keyboard, touch screen display, etc.) to navigate through a menu list 504 which may be invoked in display 222. Menu list 504 includes a plurality of function indicators 506 corresponding to a plurality of different functions which may be invoked. Some of function indicators 506 correspond to a plurality of different functions associated with messaging or messaging in connection with specific messages in menu list 504.

In the example shown in FIG. 5, function indicators 506 in menu list 504 include a "Help" function indicator corresponding to a help function; an "Open" function indicator corresponding to an "open message" function; a "Mark Unopened" function indicator corresponding to a "marked message as unopened" function; an "Clear Chat" function indicator corresponding to a "clear or erase previous chat" function; a "Delete" function indicator corresponding to a "delete message" function; a "Compose E-mail" function indicator corresponding to a "create new e-mail message" function; a "Compose PIN" function indicator corresponding to a "create new PIN message" function; a "Compose SMS/MMS" function indicator 508 corresponding to a "create new SMS or MMS message" function; and an "Instant Messaging" function indicator 510 corresponding to a "create new instant message" function.

The end user may initiate the non-instant communication mode with reference to FIG. 5 by selecting the Compose E-mail function indicator corresponding to creating a new e-mail message, or the Compose SMS/MMS function indicator 508 corresponding to creating a new SMS/MMS message. On the other hand, the end user may initiate the instant communication mode by selecting the "Instant Messaging" function indicator corresponding to creating a new instant message, by selecting the "Compose PIN" function indicator corresponding to creating a new PIN message (e.g. BlackBerry Messaging (BBM) messaging or message conversation), or by selecting the "Open" function indicator corresponding to opening a new or existing message conversation or chat of the "instant" type.

Figure 6:
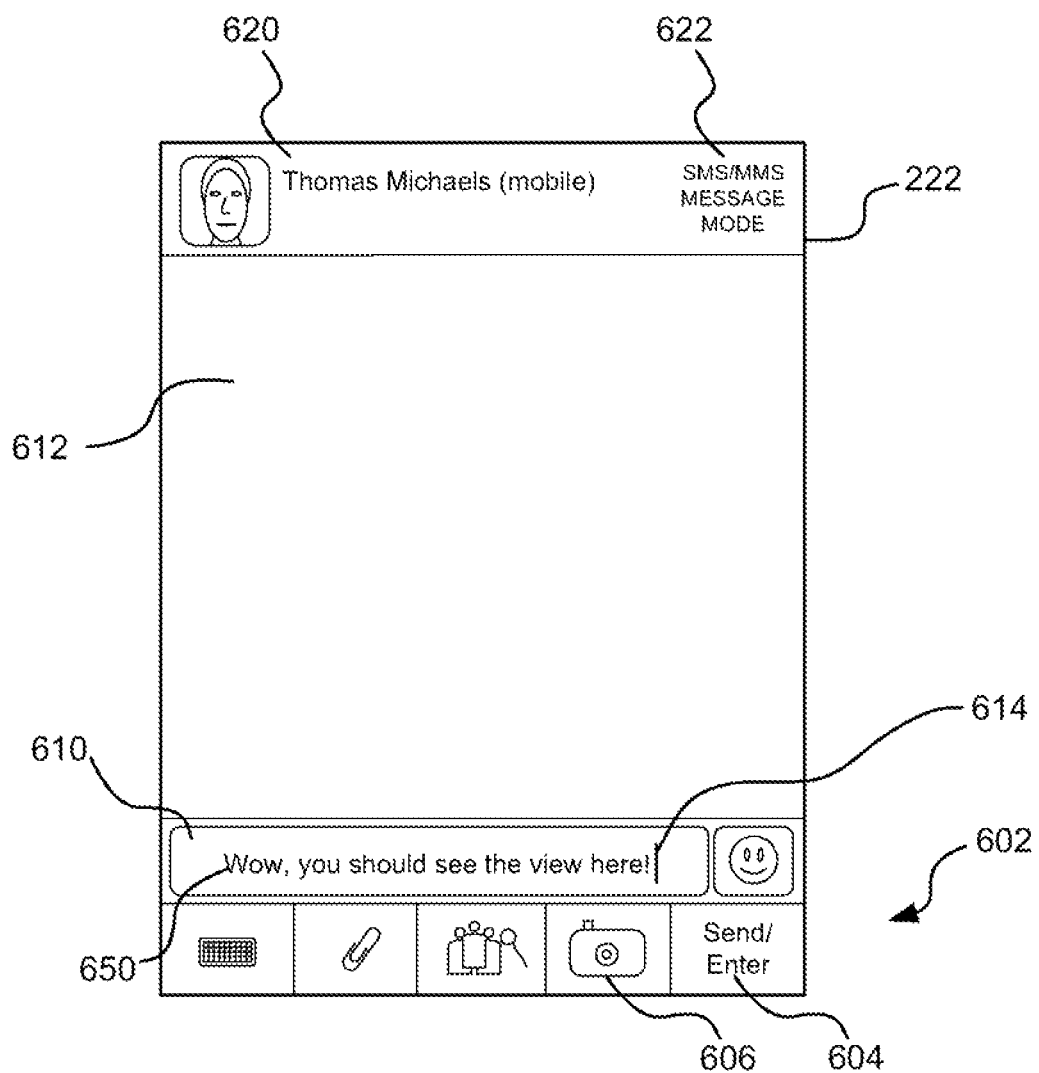
Figure 7:
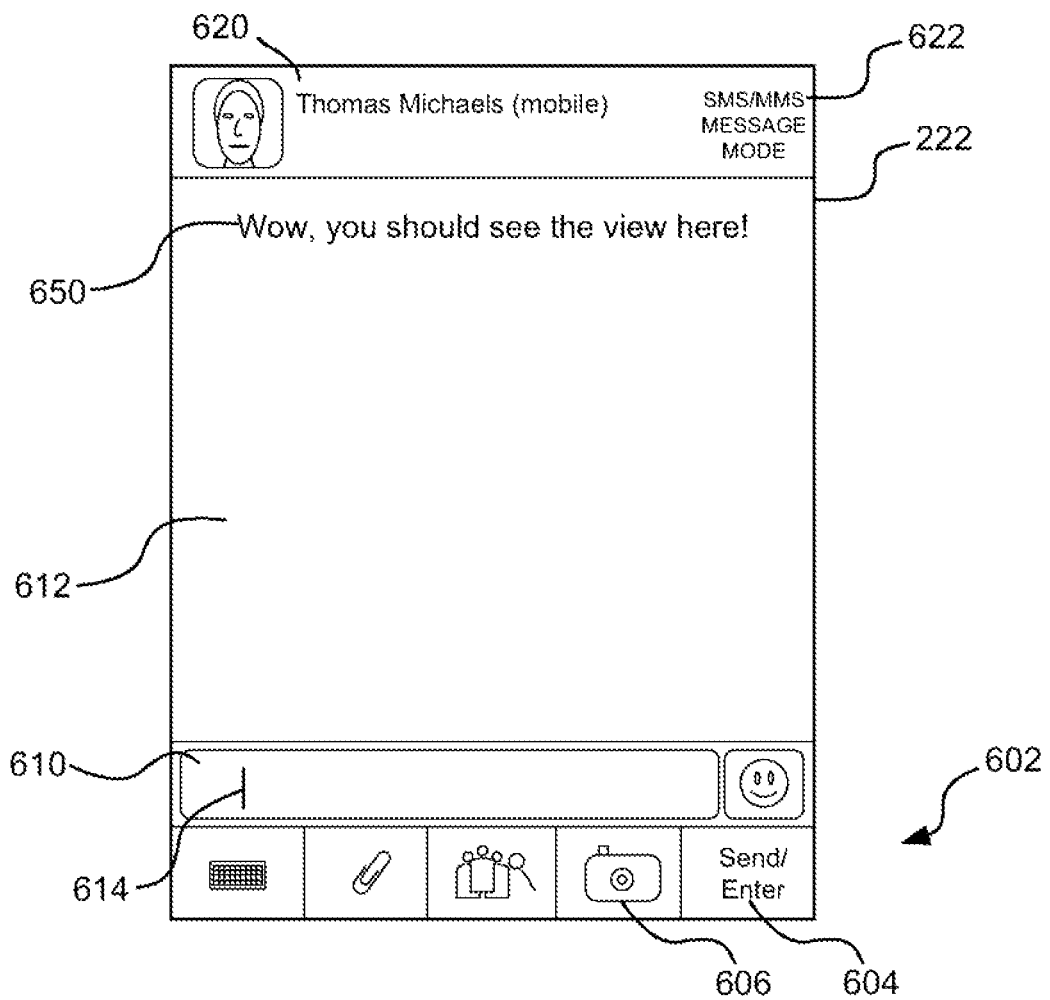
Figure 8:
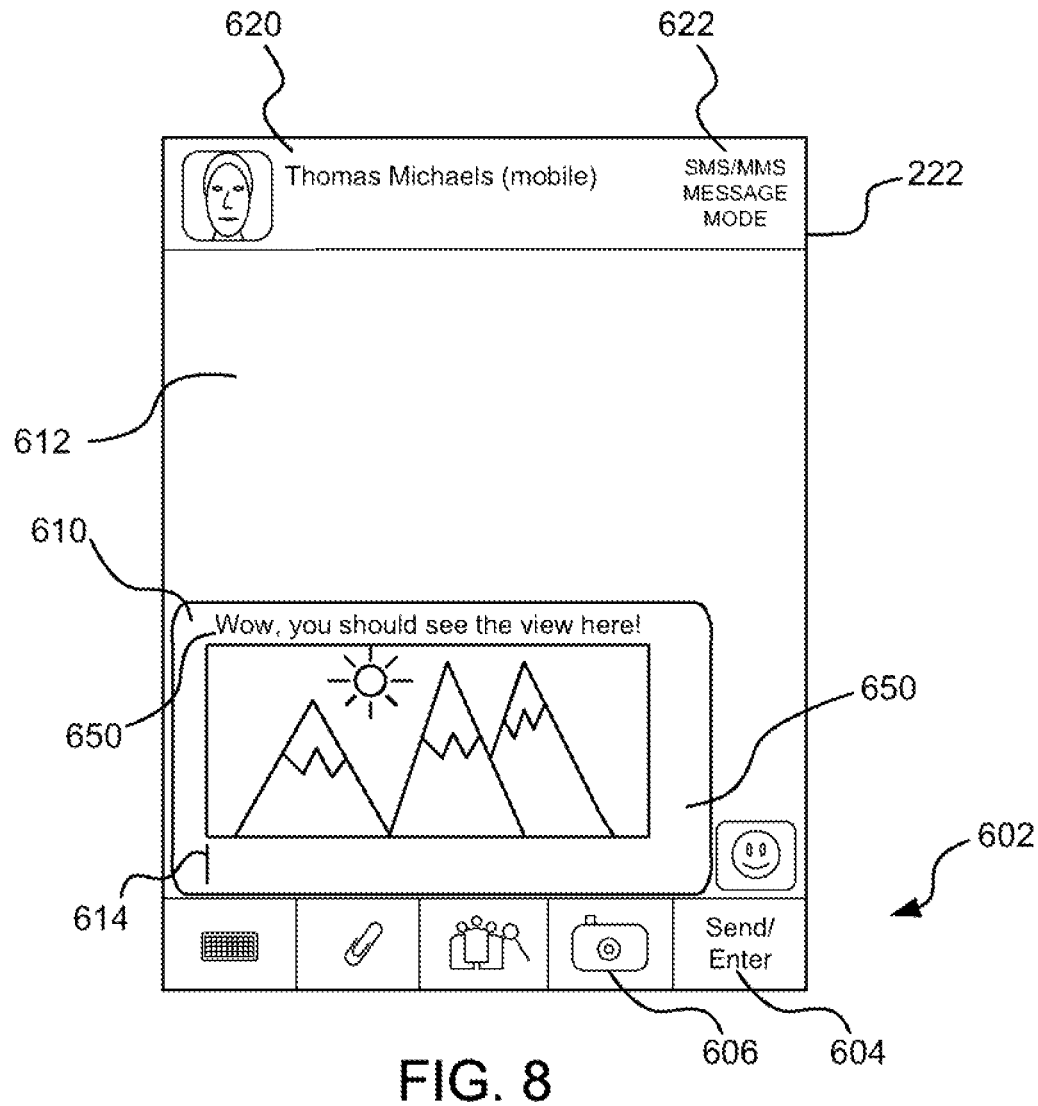
Figure 9:
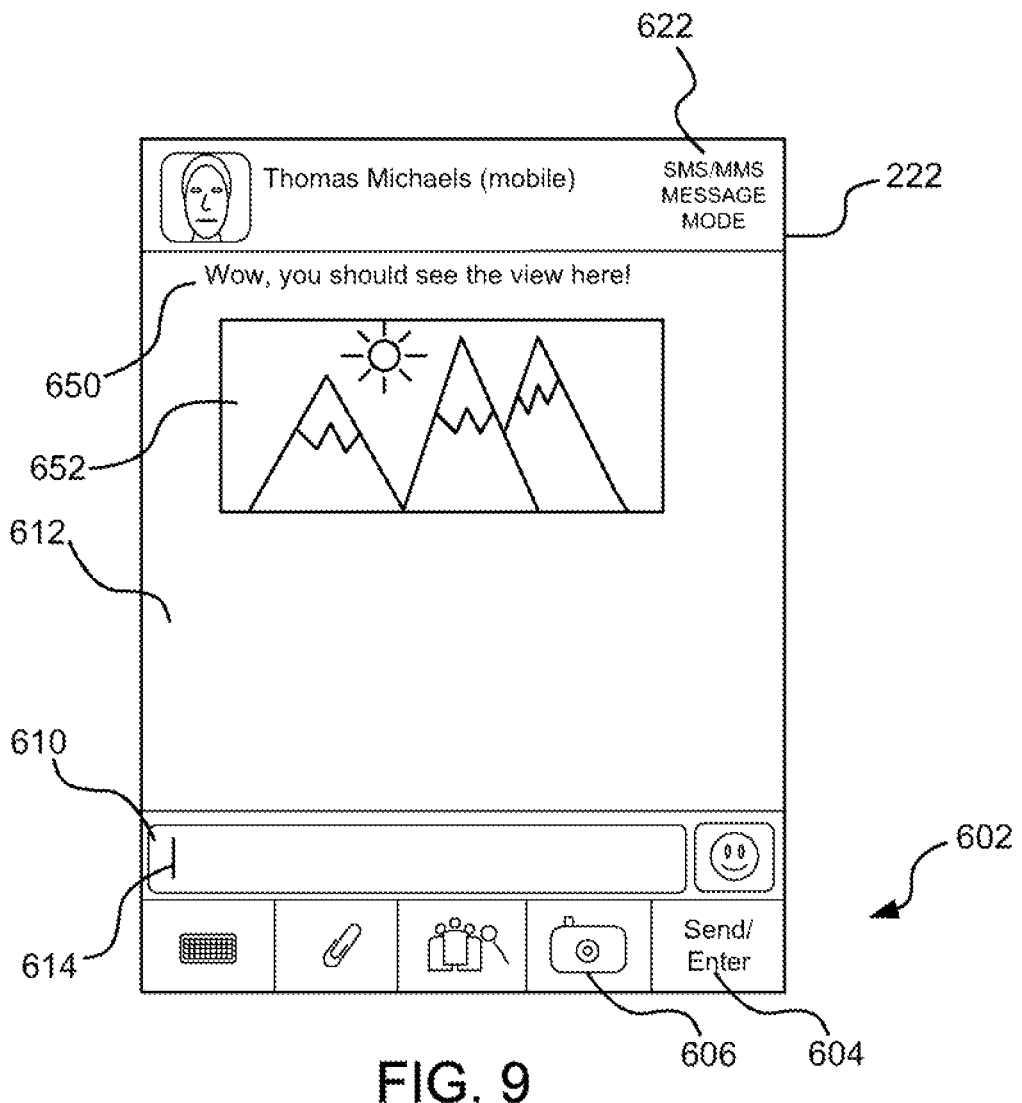

For the non-instant communication mode, FIG. 6 shows the user interface which includes display 222 and a plurality of keys 602, where the keys include a send (or enter) key 604 and a camera shutter key 606. In addition, a presentation for composing a new, non-instant message to be sent is shown. A messaging mode indicator 622 which corresponds to the currently selected non-instant communication mode ("SMS/MMS messaging mode") is presented in display 222. A text entry field 610 for entering text for the message to the message recipient is also presented in display 222 (e.g. block 406 of FIG. 4). A message sent field 612 of the presentation is left blank, as no message has yet been sent. The message will be sent to a message recipient which is indicated by a message recipient name or address selected by the end user and provided in a message recipient field 620.

In FIG. 6 it is shown that alphanumeric characters or text 650 is entered into text entry field 610 (e.g. block 410 of FIG. 4), and a cursor 614 is presented at the end of the entered text 640. From FIG. 6, in response to the actuation of the send/enter key 604 (block 414 of FIG. 4), the message which includes the text 650 is sent via the wireless network to the selected message recipient address (block 420 of FIG. 4). As a result, the presentation is changed as provided in FIG. 7, where text 650 is populated in message sent field 612 and removed from text entry field 610.

On the other hand, and again from FIG. 6, in response to the actuation of the camera shutter key 606 (block 412 of FIG. 4), a photographic image is captured and therefore text entry field 610 is populated with a view of the captured photographic image in addition to the text 650 which was previously entered. At this point, the message has not been sent. The preview mode of the camera module may or may not be suppressed in this mode, and the processor may also refrain from presenting any user input prompts (e.g. refrain from presenting a user input prompt for saving the photographic image, etc.). Immediately following this capturing of the image, and in response to the actuation of the send/enter key 604 (block 414 of FIG. 4), the message which includes text 650 and photographic image 652 is sent via the wireless network to the selected message recipient address (block 420 of FIG. 4). As a result, the presentation is changed as provided in FIG. 9, where text 650 and photographic image 652 are populated in message sent field 612 and removed from text entry field 610.

Figure 10:
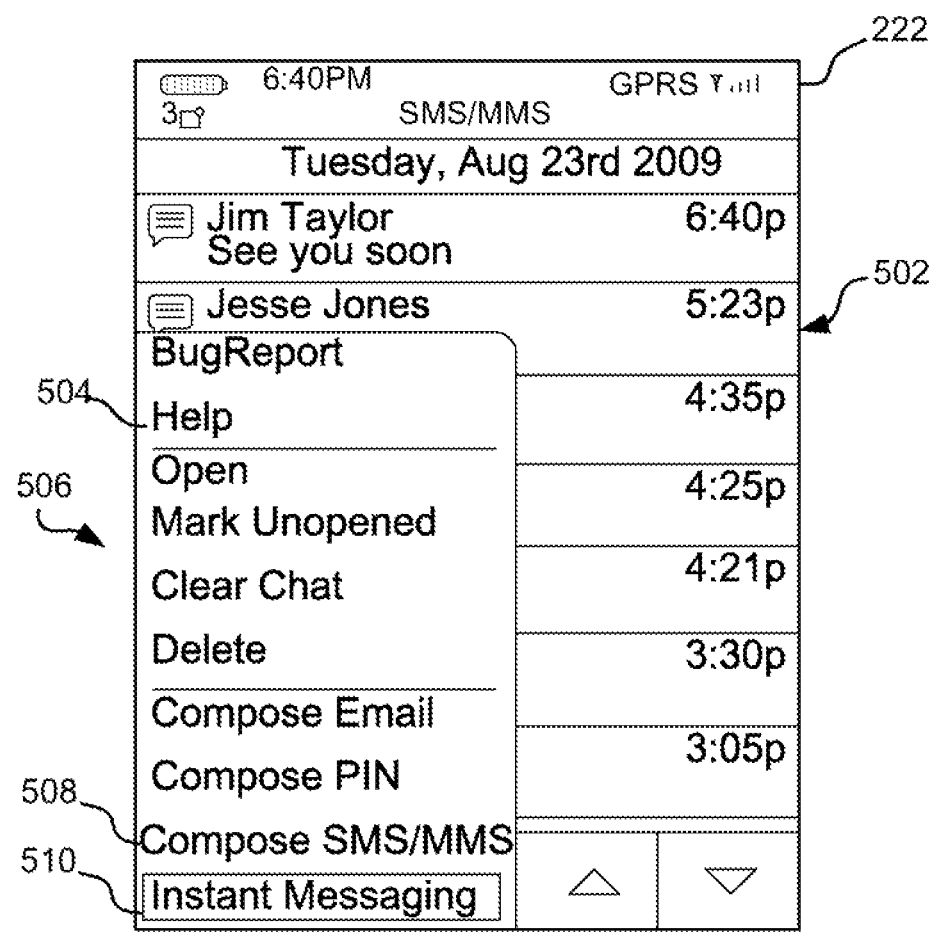
Figure 11:
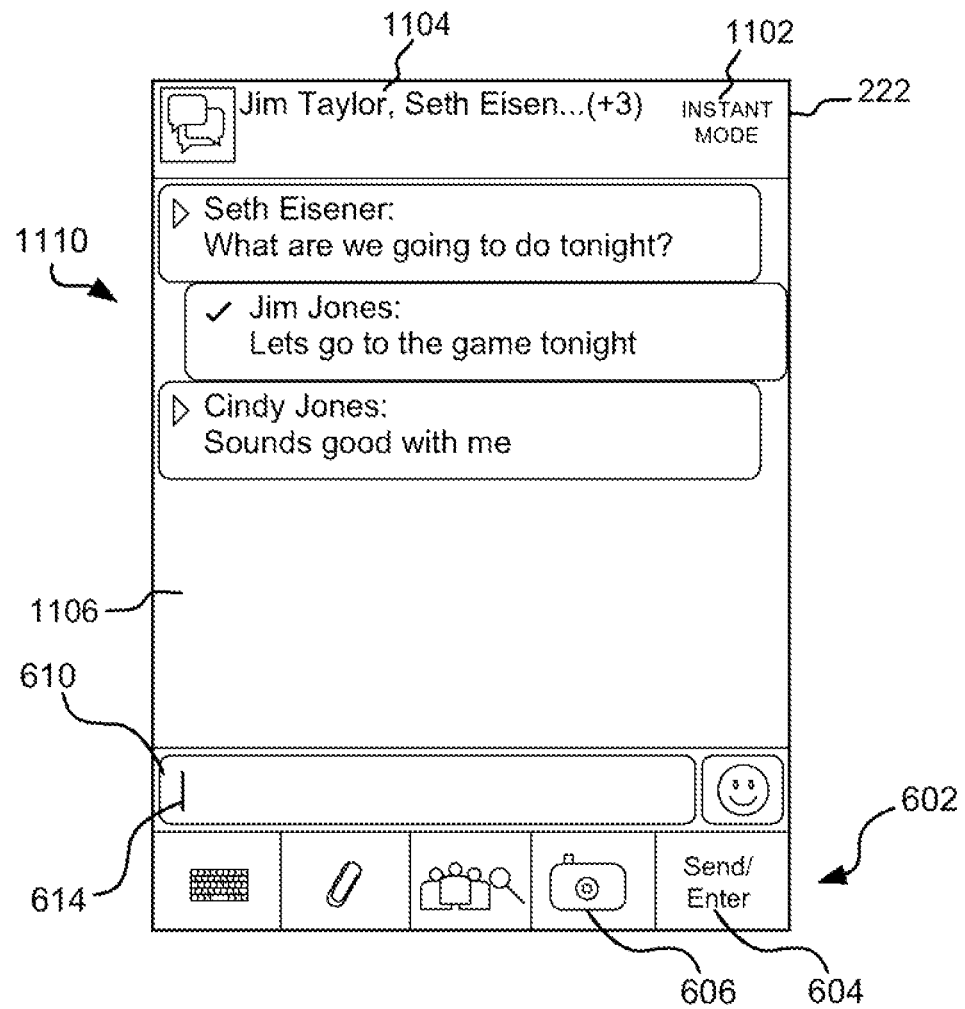
Figure 12:
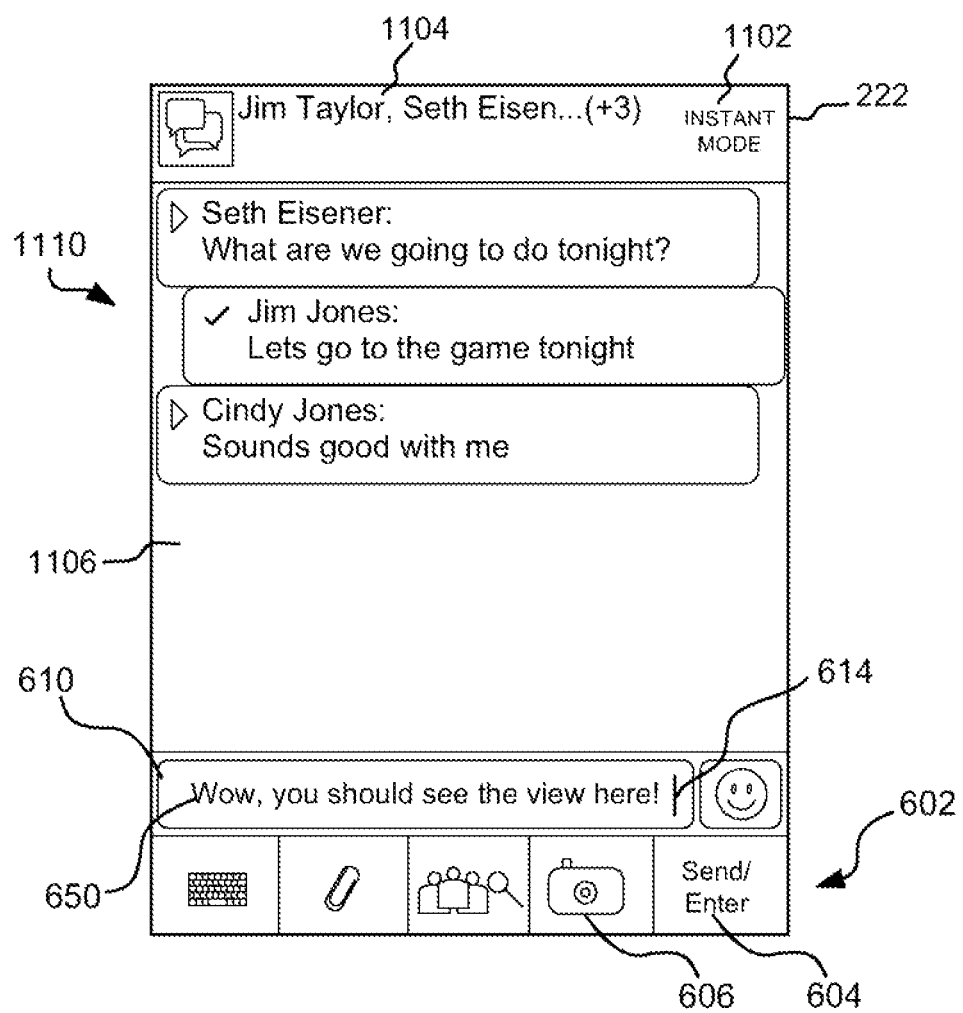

FIGS. 10-16 are illustrative presentations associated with messaging in the instant communication mode, corresponding to blocks 403-440 of FIG. 4. FIG. 10 shows that the instant messaging mode may be entered, for example, by selecting the "Instant Messaging" function indicator 510 corresponding to the "create new instant message" function, as previously described. In FIG. 11, a presentation for communicating in the instant communication mode is shown. A messaging mode indicator 1102 which corresponds to the currently selected instant communication ("Instant Mode") is presented in display 222. A conversation thread field 1106 which includes a conversation thread 1110 is presented (e.g. block 424 of FIG. 4). Text entry field 610 for entering text for composing a message is also presented in display 222 (e.g. block 426 of FIG. 4). The message will be sent to one or more participants which are indicated by participant names or addresses provided in a message participants field 1104.

In FIG. 11, it is shown that no text has been added to text entry field 610. Subsequently, in FIG. 12 it is shown that alphanumeric characters or text 650 are entered into text entry field 610 (e.g. block 430 of FIG. 4), and a cursor 614 remains at the end of the entered text 650. From FIG. 12, and in response to the actuation of the send/enter key 604 (e.g. block 434 of FIG. 4), the message which includes text 650 is sent to the one or more participants via the wireless network (e.g. block 440 of FIG. 4). As a result, the presentation is changed as provided in FIG. 13, where text 650 is populated in conversation thread 1106 and removed from text entry field 610. Subsequent actuations of the send/enter key 604 with text entered in text input field 610 will cause the same actions to be repeated.

On the other hand, and from FIG. 11, in response to the actuation of the camera shutter key 606 (e.g. block 432 of FIG. 4), the automatic multi-step process is performed where a photographic image is captured, attached to a message, and sent to the one or more participants. As a result, the presentation is changed as provided in FIG. 14, where photographic image 652 (or an image or thumbnail thereof) is populated in conversation thread 1106. Note that the preview mode of the camera module may be suppressed, and the processor may also refrain from presenting any user input prompts, e.g. a user input prompt for saving the photographic image, etc. Subsequent actuations of the camera shutter key 606 will cause the same actions to be repeated.

Figure 13:
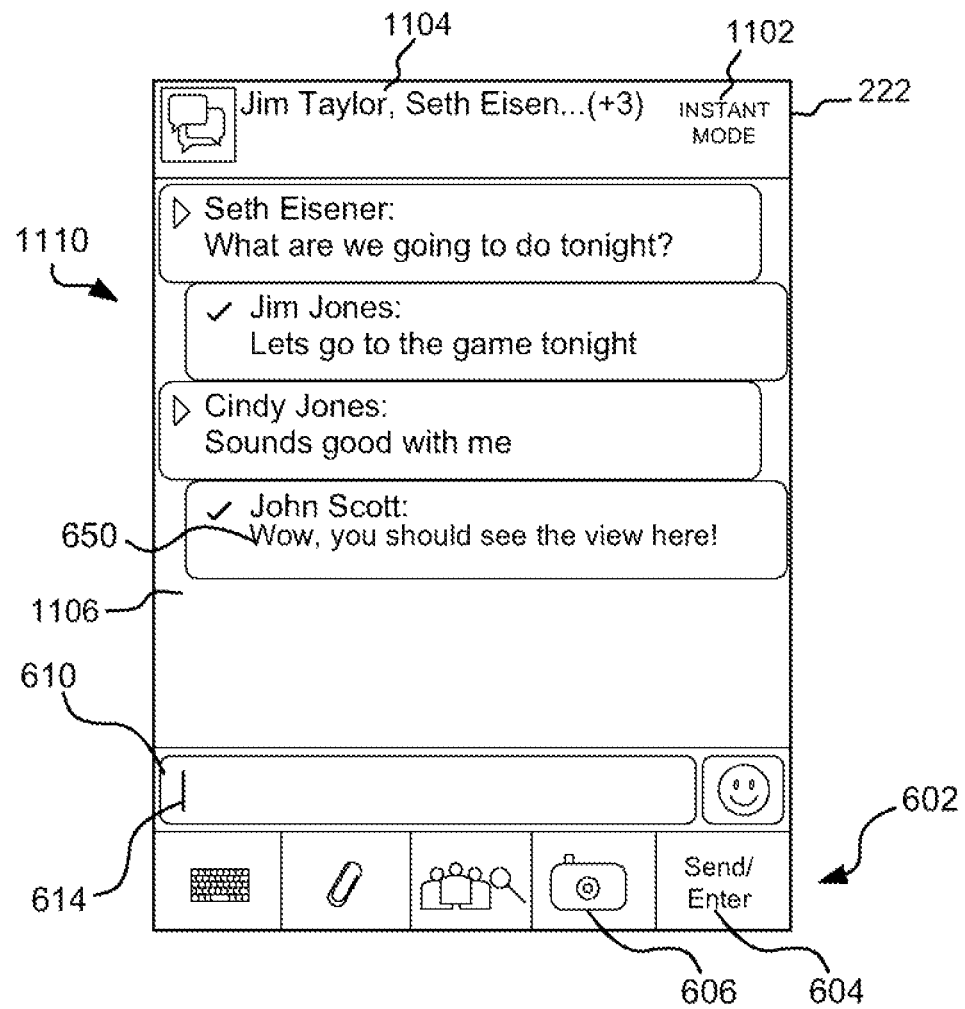

Even further, and in this case from FIG. 13 where text has been entered, in response to the actuation of the camera shutter key 606 (e.g. block 432 of FIG. 4), the automatic multi-step process is performed where a photographic image is captured, attached to a message which includes the entered text, and sent to the one or more participants (e.g. block 440 of FIG. 4). As a result, the presentation is changed as provided in FIG. 15, where text 650 and photographic image 652 are populated in conversation thread 1106 and removed from text entry field 610. Subsequent actuations of the camera shutter key 606 with text entered into text input field 610 will cause the same actions to be repeated.

Figure 14:
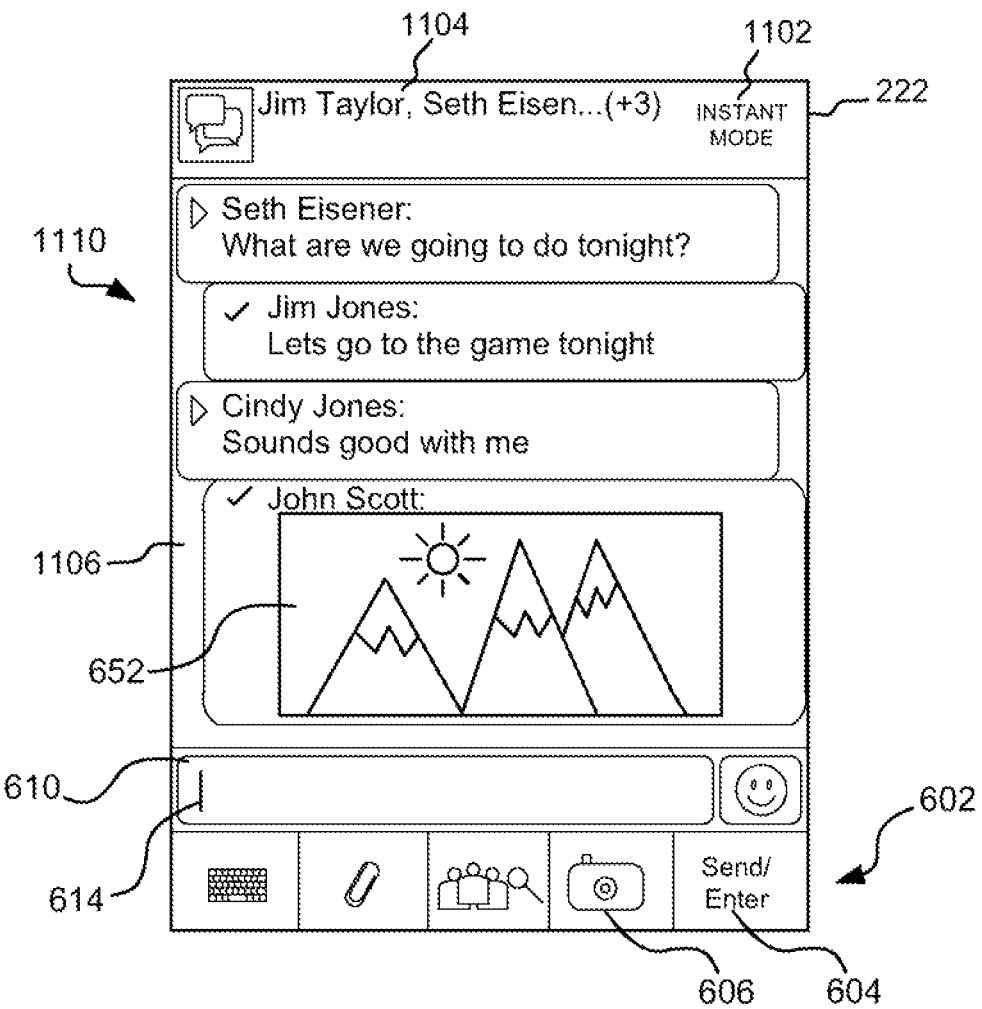
Figure 15:
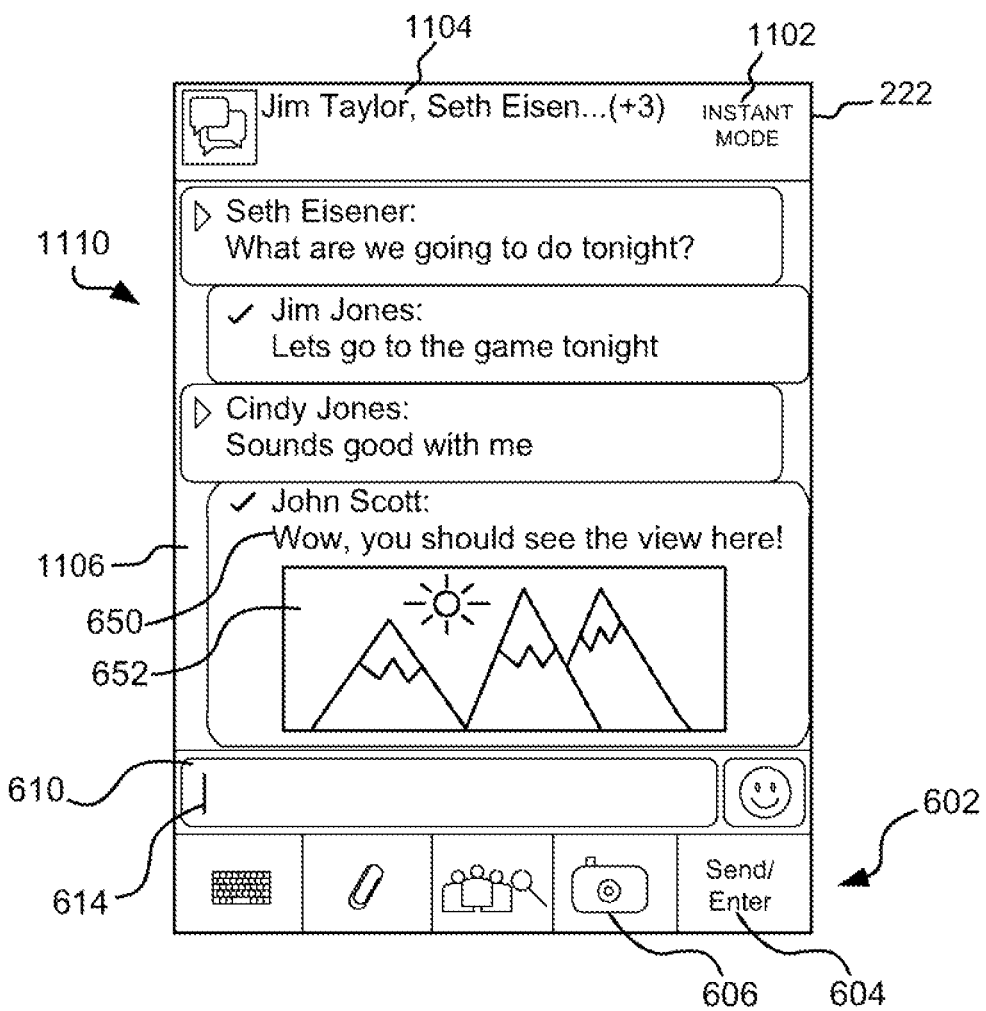
Figure 16:
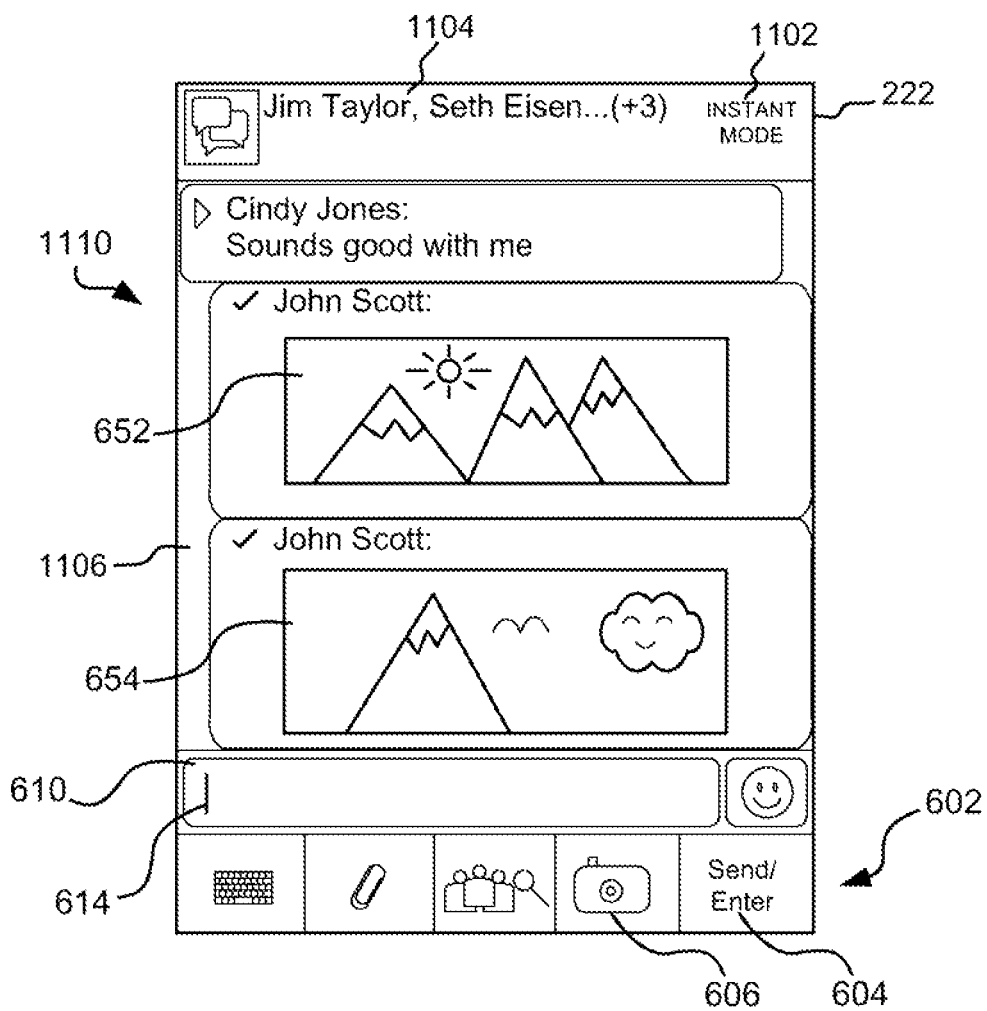

Yet even further, and in this case from FIG. 14 where photographic image 652 has already been sent, in response to a subsequent actuation of camera shutter key 606 (e.g. block 432 of FIG. 4), the automatic multi-step process is again performed where a photographic image is captured, attached to a message, and sent to the one or more participants (e.g. block 440 of FIG. 4). As a result, the presentation is changed as provided in FIG. 16 where an additional photographic image 654 (or an image or thumbnail thereof) is populated in conversation thread 1106. Subsequent actuations of the camera shutter key 606 will cause the same actions to be repeated.

The techniques of the present disclosure provide advantages over conventional messaging techniques. The processing involved typically disrupt the natural flow for messaging for the end user, options are limited, and the communication experience may be cumbersome and inefficient.

Thus, user interface methods and apparatus for use in communicating text and photo messages from a portable communication device have been described. In one illustrative example, in an instant communication session, the portable device displays a message thread involving two or more participants and a text input field for entering text. In response to an input to capture an image, the portable device automatically captures a photographic image via the camera module, attaches the photographic image to a message, and sends the message to at least one of the two or more participants.

In another illustrative example, in an instant communication mode, the device presents a conversation thread of a message conversation involving one or more participants. A text input field for entering text for the message conversation is also presented. In response to detecting an actuation of a send or enter key, the device sends to the one or more participants a message which includes the text from the text input field. On the other hand, in response to detecting an actuation of a camera shutter key, the device performs an automatic multi-step process which includes capturing a photographic image with a camera module, attaching the photographic image to a message, and sending to the one or more participants the message which includes the attached photographic image. A camera preview mode and user input prompts may be suppressed during this process. On the other hand, in a non-instant communication mode, in response to detecting an actuation of the camera shutter key, the device performs a multi-step process which includes capturing a photographic image with the camera module and attaching the photographic image to a message, but without sending the message. Even further, in a voice call mode where a voice call is maintained with a voice call participant via the wireless network, in response to detecting an actuation of the camera shutter key, the device performs an automatic multi-step process which includes capturing a photographic image with the camera module, attaching the photographic image to a message, and sending to the voice call participant the message which includes the attached photographic image.

The above-described embodiments of disclosure are intended to be examples only. For example, instant communications may involve the communication of messages via SMS and/or MMS, where the messaging application is configured to present messages with the same participants in the same conversation thread. Also for example, the camera shutter may be a hardware key, a soft key, or be invoked by a gesture. Alterations, modifications, and variations may be effected to particular embodiments by those of skill in art without departing from scope of invention, which is defined solely by claims appended hereto.

What is claimed is:

1. A method for use in messaging from a portable communication device having a camera module, the method comprising:
   in an instant communication mode, presenting a conversation thread of a message conversation involving one or more participants, and presenting text input field for entering text in the message conversation;
   during the presentation of the conversation thread and the text input field for entering text, in response to detecting an actuation of a send key of the portable communication device, sending by the portable communication device to the one or more participants a message which includes the text from the text input field; and
   in the instant communication mode, in response to detecting an actuation of a camera shutter key, performing by the portable communication device an automatic multi-step process which includes capturing a photographic image via the camera module, attaching the photographic image to the message, and sending, to the one or more participants in the message conversation, the message which includes the attached photographic image,
   wherein the send key and the camera shutter key are separate keys and wherein actuation of the send key does not cause a photographic image to be captured.

2. The method of claim 1, further comprising:
   in response to detecting the actuation of the camera shutter key, suppressing a preview mode of the camera module.

3. The method of claim 2, further comprising:
   opening a camera application of the portable communication device; and
   in response to opening of the camera application, invoking the preview mode of the camera module.

4. The method of claim 1, further comprising:
refraining from presenting a user input prompt for saving the photographic image after capturing the photographic image with the camera module.

5. The method of claim 1, further comprising:
in a non-instant communication session, during presentation of a text input field for entering text:
in response to detecting an actuation of the send key or an enter key, sending to one or more recipients a message which includes the text from the text input field;
in response to detecting an actuation of the camera shutter key, performing a multi-step process which includes capturing a photographic image with the camera module and attaching the photographic image to a message, without sending the message; and
in response to detecting an actuation of the send or enter key while the photographic image is attached to the message, sending to the one or more recipients the message which includes the attached photographic image.

6. The method of claim 1, wherein the instant communication session comprises an instant message (IM) communications or BlackBerry Messenger (BBM) message communications.

7. The method of claim 5, wherein the non-instant instant communication session comprises Short Message Service (SMS) message communications or electronic mail (e-mail) message communications.

8. The method of claim 1, further comprising:
in a voice call mode with a voice call maintained with a voice call participant via a wireless network: in response to detecting an actuation of a camera shutter key, performing an automatic multi-step process which includes capturing a photographic image with the camera module, attaching the photographic image to a message, and sending to the voice call participant the message which includes the attached photographic image.

9. A non-transitory computer readable medium, comprising:
computer instructions stored in the computer readable medium;
the computer instructions being executable by one or more processors of a communication device for:
in an instant communication mode, presenting a conversation thread of a message conversation involving one or more participants, and presenting a text input field for entering text in the message conversation;
during the presentation of the conversation thread and the text input field for entering text, in response to detecting an actuation of a send key of the portable communication device, sending by the portable communication device to the one or more participants a message which includes the text from the text input field; and
in the instant communication mode, in response to detecting an actuation of a camera shutter key, performing by the portable communication device an automatic multi-step process which includes capturing a photographic image via a camera module, attaching the photographic image to a message, and sending, to the one or more participants, the message which includes the attached photographic image,
wherein the send key and the camera shutter key are separate keys and wherein actuation of the send key does not cause a photographic image to be captured.

10. A wireless communication device, comprising:
one or more processors;
a radio frequency (RF) transceiver coupled to the one or more processors;
a user interface coupled to the one or more processors, the user interface comprising a display;
memory coupled to the one or more processors;
the one or more processors being configured to:
in an instant communication mode, presenting a conversation thread of a message conversation involving one or more participants, and presenting a text input field for entering text in the message conversation;
during the presentation of the conversation thread and the text input field for entering text, in response to detecting an actuation of a send key of the portable communication device, sending by the portable communication device to the one or more participants a message which includes the text from the text input field; and
in the instant communication mode, in response to detecting an actuation of a camera shutter key, performing by the portable communication device an automatic multi-step process which includes capturing a photographic image via a camera module, attaching the photographic image to the message, and sending via the RF transceiver to the one or more participants, the message which includes the attached photographic image,
wherein the send key and the camera shutter key are separate keys and wherein actuation of the send key does not cause a photographic image to be captured.

11. The wireless communication device of claim 10, wherein the one or more processors are further configured to suppress a preview mode of the camera module.

12. The wireless communication device of claim 11, wherein the one or more processors are further configured to:
open a camera application;
in response to opening of the camera application, invoke the preview mode of the camera module.

13. The wireless communication device of claim 10, wherein the one or more processors are further configured to refrain from presenting a user input prompt for saving the photographic image after capturing the photographic image with the camera module.

14. The wireless communication device of claim 10, wherein the one or more processors are further configured to:
in a non-instant communication session, during presentation of a text input field for entering text:
in response to detecting an actuation of the send or an enter key, send to one or more recipients via the RF transceiver a message which includes the text from the text input field;
in response to detecting an actuation of the camera shutter key, performing a multi-step process which includes capturing a photographic image with the camera module and attaching the photographic image to a message, without sending the message via the RF transceiver; and
in response to detecting an actuation of the send or enter key while the photographic image is attached to the message, sending to the one or more recipients via the RF transceiver the message which includes the attached photographic image.

15. The wireless communication device of claim 10, wherein the instant communication session comprises instant message (IM) communications or BlackBerry Messenger (BBM) message communications.

16. The wireless communication device of claim 14, wherein the non-instant instant communication session comprises Short Message Service (SMS) message communications or electronic mail (e-mail) message communications.

17. The wireless communication device of claim 10, wherein the portable communication device comprises a cellular telephone operative in a cellular telecommunications network.

18. The wireless communication device of claim 10, wherein the one or more processors are further configured to:
   in a voice call mode where a voice call is maintained with a voice call participant via the wireless network: in response to detecting an actuation of a camera shutter key, performing an automatic multi-step process which includes capturing a photographic image with the camera module, attaching the photographic image to a message, and sending to the voice call participant via the RF transceiver the message which includes the attached photographic image.

* * * * *